United States Patent
Lee et al.

(10) Patent No.: US 10,725,608 B2
(45) Date of Patent: Jul. 28, 2020

(54) ELECTRONIC DEVICE AND METHOD FOR SETTING BLOCK

(71) Applicant: Samsung Electronics Co., Ltd., Gyeonggi-do (KR)

(72) Inventors: Sang-Mook Lee, Gyeonggi-do (KR); Hye-Soon Jeong, Gyeongsangbuk-do (KR); Yoo-Jin Hong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 427 days.

(21) Appl. No.: 14/838,990

(22) Filed: Aug. 28, 2015

(65) Prior Publication Data
US 2016/0062596 A1 Mar. 3, 2016

(30) Foreign Application Priority Data
Aug. 28, 2014 (KR) .......................... 10-2014-0113395

(51) Int. Cl.
*G06F 3/0481* (2013.01)
*G06F 3/0488* (2013.01)
(Continued)

(52) U.S. Cl.
CPC .......... *G06F 3/04812* (2013.01); *G06F 3/033* (2013.01); *G06F 3/0416* (2013.01); *G06F 3/0482* (2013.01); *G06F 3/0488* (2013.01); *G06F 3/04883* (2013.01); *G06F 3/04886* (2013.01); *G06K 9/2054* (2013.01); *G06F 9/451* (2018.02)

(58) Field of Classification Search
CPC .. G06F 3/033; G06F 3/04812; G06F 3/04883; G06F 9/4443; G06F 9/951; G06F 9/9451; G06F 9/451; G06K 9/2054
See application file for complete search history.

(56) References Cited

U.S. PATENT DOCUMENTS 8,643,616 B1 2/2014 Zhang et al.
2008/0297482 A1* 12/2008 Weiss .................. G06F 3/04883
345/173
(Continued)

FOREIGN PATENT DOCUMENTS

CN 103135921 6/2013
KR 1020100082903 7/2010
(Continued)

OTHER PUBLICATIONS

International Search Report dated Dec. 10, 2015 issued in counterpart application No. PCT/KR2015/008998, 7 pages.
(Continued)

*Primary Examiner* — Eric J. Bycer
(74) *Attorney, Agent, or Firm* — The Farrell Law Firm, P.C.

(57) ABSTRACT

Methods and apparatuses are provided for setting a block in an electronic device. Content is displayed on a display of the electronic device. The electronic device senses a first touch input on an area for setting the displayed content in the display as a block. The electronic device senses a second touch input while the first touch input is maintained on the area. The electronic device sets at least a part of the content as the block, based on a movement of the second touch input.

17 Claims, 14 Drawing Sheets

(51) Int. Cl.
  *G06F 3/033*  (2013.01)
  *G06F 3/041*  (2006.01)
  *G06F 3/0482* (2013.01)
  *G06K 9/20*   (2006.01)
  *G06F 9/451*  (2018.01)

(56) References Cited

U.S. PATENT DOCUMENTS

| | | | |
|---|---|---|---|
| 2009/0228842 A1* | 9/2009 | Westerman | G06F 3/04883 715/863 |
| 2010/0245261 A1 | 9/2010 | Karlsson | |
| 2010/0309140 A1* | 12/2010 | Widgor | G06F 3/04883 345/173 |
| 2011/0231796 A1 | 9/2011 | Vigil | |
| 2011/0260962 A1* | 10/2011 | Benko | G06F 3/0482 345/156 |
| 2012/0030566 A1* | 2/2012 | Victor | G06F 3/0488 715/702 |
| 2012/0192056 A1* | 7/2012 | Migos | G06F 3/04883 715/230 |
| 2012/0254795 A1 | 10/2012 | Van Os et al. | |
| 2012/0306772 A1* | 12/2012 | Tan | G06F 3/0488 345/173 |
| 2013/0127749 A1 | 5/2013 | Yamamoto et al. | |
| 2014/0071171 A1* | 3/2014 | McGowan | G06F 3/04883 345/661 |
| 2014/0145945 A1 | 5/2014 | Shin | |
| 2014/0173484 A1* | 6/2014 | Hicks | G06F 3/0486 715/769 |
| 2014/0215393 A1* | 7/2014 | Schwartz | G06F 3/0482 715/810 |
| 2014/0306897 A1* | 10/2014 | Cueto | G06F 3/04883 345/173 |

FOREIGN PATENT DOCUMENTS

| | | |
|---|---|---|
| KR | 101013219 | 2/2011 |
| KR | 101156610 | 6/2012 |
| KR | 1020140034399 | 3/2014 |
| KR | 1020140062747 | 5/2014 |
| WO | WO 2012/118342 | 9/2012 |
| WO | WO 2013/141464 | 9/2013 |

OTHER PUBLICATIONS

European Search Report dated Feb. 2, 2016 issued in counterpart application No. 15182947.0-1507, 8 pages.
Chinese Office Action dated Feb. 20, 2019 issued in counterpart application No. 201580046751.X, 21 pages.

* cited by examiner

ELECTRONIC DEVICE AND METHOD FOR SETTING BLOCK

PRIORITY

This application claims priority under 35 U.S.C. § 119(a) to Korean Patent Application Serial No. 10-2014-0113395, which was filed in the Korean Intellectual Property Office on Aug. 28, 2014, the content of which is incorporated herein by reference.

BACKGROUND

1. Field of the Invention

The present disclosure relates to an electronic device and method of setting a block.

2. Description of Related Art

In order to increase the effective value of an electronic device and meet various user demands, various applications have been developed that are executable by the electronic device. Through such applications, a user is capable of selecting at least a part of the content displayed on a display of a mobile electronic device, such as, for example, a smart phone, a portable phone, a personal computer (PC), and a tablet PC.

When setting a block with respect to content displayed on a display, the user is generally required to hold a long-press at a desired point on a text window, so as to display a block, touch and select the left end or the right end of the block, and then drag the left end or the right end to a desired point.

However, it is difficult to accurately set a block since a text window is hidden by the user's finger performing the interaction. In addition, it is difficult to accurately touch the left end and the right end of the text window. Thus, it is difficult to set a block by dragging one of the ends of the block.

SUMMARY

The present disclosure addresses at least the above problems and/or disadvantages and provides at least the advantages described below. Accordingly, an aspect of the present disclosure provides an electronic device and a method of setting a block.

According to an embodiment of the present disclosure, a method is provided for setting a block in an electronic device. Content is displayed on a display of the electronic device. The electronic device senses a first touch input on an area for setting the displayed content in the display as a block. The electronic device senses a second touch input while the first touch input is maintained on the area. The electronic device sets at least a part of the content as the block, based on a movement of the second touch input.

According to an embodiment of the present disclosure, a method is provided for setting a block in an electronic device. Content is displayed on a display of the electronic device. The electronic device senses a touch on the content. A cursor is displayed on the display at a point where the touch is sensed. The electronic device senses a touch input on a keypad of the electronic device. The cursor is moved and displayed within the content, on the display, based on a movement of the touch input.

According to an embodiment of the present disclosure, an electronic device is provided for setting a block. The electronic device includes a display configured to display content. The electronic device also includes a processor configured to sense a first touch input on an area for setting the displayed content in the display as a block, to sense a second touch input while the first touch input is maintained on the area, and set at least a part of the content as the block, based on a movement of the second touch input.

According to an embodiment of the present disclosure, a non-transitory computer-readable storage medium is provided that stores a program including instructions to control setting of a block in an electronic device. The instructions include a first instruction set that displays content; a second instruction set that sense a first touch input on an area for setting the displayed content in the display as a block; a third instruction set that senses a second touch input while the first touch input is maintained on the area; and a fourth instruction set that sets at least a part of the content as the block, based on a movement of the second touch input. According to an embodiment of the present disclosure, an electronic device is provided for setting a block. The electronic device includes a display configured to display content and a cursor. The electronic device also includes a processor configured to sense a touch on the content, control display of the cursor at a point where the touch is sensed, sense a touch input on a keypad of the electronic device, and move and display the cursor within the content, on the display, based on a movement of the touch input.

According to an embodiment of the present disclosure, a non-transitory computer-readable storage medium is provided that stores a program including instructions to control setting of a block in an electronic device. The instructions include a first instruction set that displays content; a second instruction set that senses a touch on the content; a third instruction set that displays a cursor at a point where the touch is sensed; a fourth instruction set that senses a touch input on a keypad of the electronic device; and a fifth instruction set that moves and displays the cursor within the content, on the display, based on a movement of the touch input.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

Figure 1:
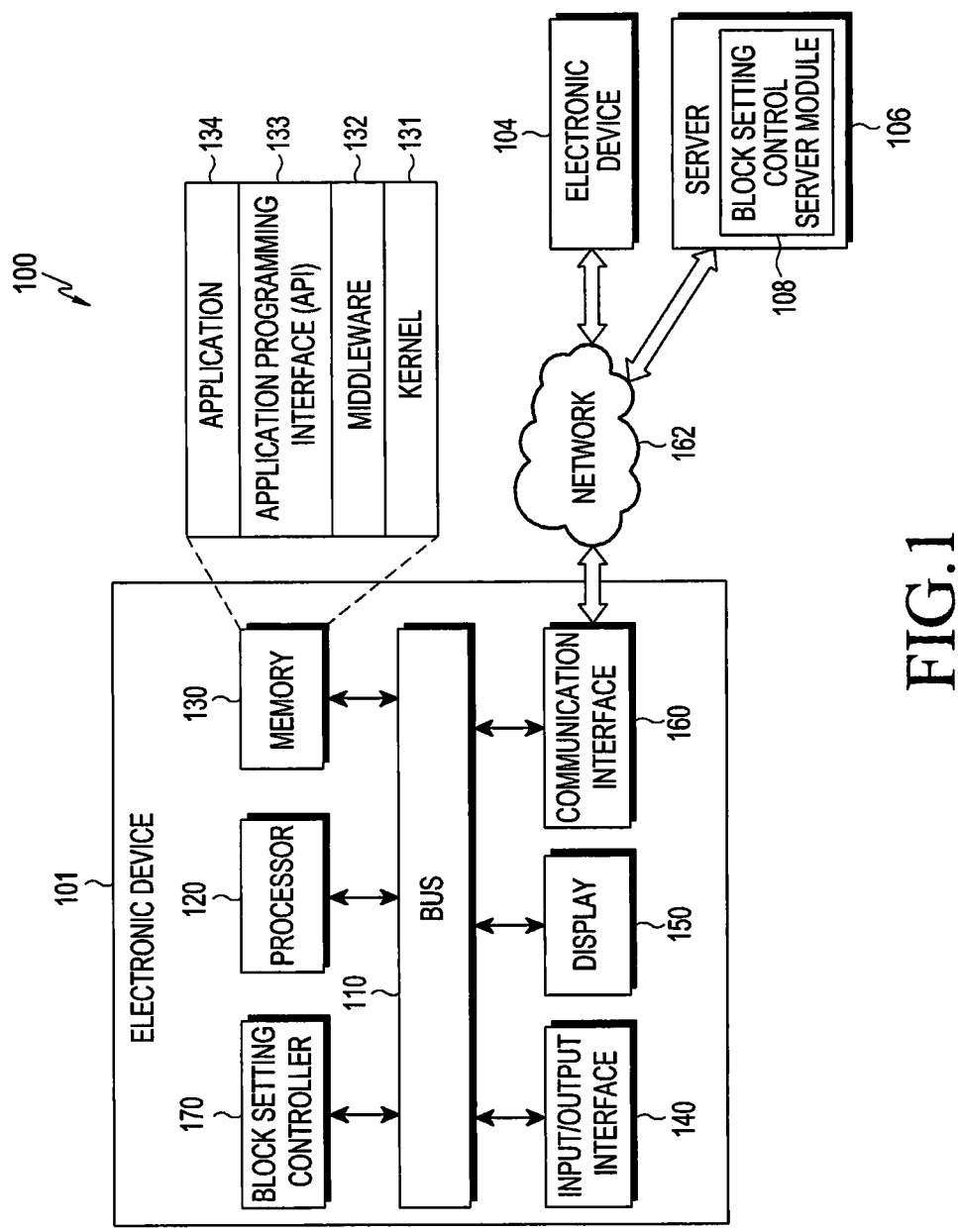
FIG. 1 is a diagram illustrating a network environment including an electronic device, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Herein, the expressions "include" or "may include" refer to the existence of a corresponding function, operation, or element, and does not preclude or more additional functions, operations, or elements. In the present disclosure, terms such as "include" and/or "have" may be construed to denote a certain characteristic, number, step, operation, constituent element, element or a combination thereof, but may not be construed to exclude the existence of or a possibility of one or more additional characteristics, numbers, steps, operations, constituent elements, elements or combinations thereof.

Herein, the expression "or" includes any or all combinations of words enumerated together. For example, the expression "A or B" may include A, may include B, or may include both A and B.

Herein, expressions including ordinal numbers, such as, for example, "first" and "second," etc., may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. Additionally, a first element could be referred to as a second element, and similarly, a second element could also be referred to as a first element without departing from the scope of the present disclosure.

When an element is referred to as being "coupled" or "connected" to any other element, it should be understood that the element may not only be directly coupled or connected to the other element, but a third element may also be interposed therebetween. Contrarily, when an element is referred to as being "directly coupled" or "directly connected" to any other element, it should be understood that no element is interposed therebetween.

The terms used in the present disclosure are only used to describe specific embodiments, and are not intended to limit the present disclosure. As used herein, singular forms are intended to include plural forms as well, unless the context clearly indicates otherwise.

Unless defined otherwise, all terms used herein, including technical and scientific terms, have the same meanings as those commonly understood by those of skill in the art to which the present disclosure pertains. Such terms as those defined in a generally used dictionary are to be interpreted to have meanings equal to the contextual meanings in the relevant field of art, and are not to be interpreted to have ideal or excessively formal meanings unless clearly defined in the present disclosure.

An electronic device, according to the present disclosure, may be a device that includes a display control function. For example, the electronic device may be embodied as at least one of a smartphone, a tablet PC, a mobile phone, a video phone, an electronic book (e-book) reader, a desktop PC, a laptop PC, a netbook computer, a personal digital assistant (PDA), a portable media player (PMP), an MP3 player, a mobile medical appliance, a camera, and a wearable device (e.g., a head-mounted device (HMD) such as electronic glasses, electronic clothes, an electronic bracelet, an electronic necklace, an electronic appcessory, electronic tattoos, or a smartwatch).

According to some embodiments, the electronic device may be embodied as a smart home appliance with a display control function. The smart home appliance may include at least one of, for example, a television, a digital versatile disc (DVD) player, an audio player, a refrigerator, an air conditioner, a vacuum cleaner, an oven, a microwave oven, a washing machine, an air cleaner, a set-top box, a TV box, a game console, an electronic dictionary, an electronic key, a camcorder, and an electronic picture frame.

According to an embodiment, an electronic device may include at least one of various medical devices, such as, for example, a magnetic resonance angiography (MRA) scanner, a magnetic resonance imaging (MRI) scanner, a computed tomography (CT) scanner, a scanner, an ultrasonograph, or the like, a navigation device, a global positioning system (GPS) receiver, an event data recorder (EDR), a flight data recorder (FDR), a vehicle infotainment device, electronic equipment for ship (for example, a ship navigation device, gyro-compass, and the like), avionics, a security device, a head unit for vehicle, an industrial or household robot, automatic teller machine (ATM) in banking facilities or point of sales (POS) in stores.

According to some embodiments, the electronic device may include at least one of a part of furniture or a building/structure having a display control function, an electronic board, an electronic signature receiving device, a projector, and various kinds of measuring instruments (e.g., a water meter, an electric meter, a gas meter, a radio wave meter, and the like). The electronic device, according to embodiments of the present disclosure, may be a combination of one or more of the aforementioned various devices. Also, the electronic device may be a flexible device. Further, it is obvious to those skilled in the art that the electronic device is not limited to the aforementioned devices.

Hereinafter, an electronic device, according to various embodiments of the present disclosure, will be described with reference to the accompanying drawings. In various embodiments, the term "user" may indicate a person using an electronic device or a device (e.g., an artificial intelligence electronic device) using an electronic device.

FIG. 1 is a diagram illustrating a network environment including an electronic device, according to an embodiment of the present disclosure.

Referring to FIG. 1, an electronic device 101 includes a bus 110, a processor 120, a memory 130, an input/output interface 140, a display 150, a communication interface 160, and a block setting controller 170.

The bus 110 may be a circuit that connects the above-described component elements with one another, and transfers communication (for example, a control messages) among the above-described component elements.

The processor 120 may receive instructions from other component elements (for example, the memory 130, the input/output interface 140, the display 150, the communication interface 160, the block setting controller 170, and the like) through the bus 110, analyze the received instructions, and execute a calculation or data processing according to the analyzed instructions.

The memory 130 may store instructions or data received from or generated by the processor 120 or other component elements (for example, the input/output interface 140, the display 150, the communication interface 160, or the block setting controller 170). The memory 130 includes programming modules, for example, a kernel 131, a middleware 132, an application programming interface (API) 133, an application 134, or the like. The aforementioned programming modules may be formed of software, firmware, hardware, or a combination of at least two thereof.

The kernel 131 may control or manage system resources (for example, the bus 110, the processor 120, the memory 130, or the like) used to execute operations or functions implemented by the remaining other programming modules, for example, the middleware 132, the API 133, or the application 134. Furthermore, the kernel 131 may provide an interface through which the middleware 132, the API 133, and the application 134 may access individual component elements of the electronic device 101 to control or manage them.

The middleware 132 may act as a relay to allow the API 133 or the application 134 to communicate with the kernel 131 to exchange data. Further, in association with task requests received from the applications 134, the middleware 132 may control (for example, by scheduling or load-balancing) the task requests by using, for example, a method of assigning at least one of the applications 134 a priority for using system resources (for example, the bus 110, the processor 120, the memory 130, or the like) of the electronic device 101.

The API 133 is an interface through which the application 134 controls functions provided from the kernel 131 or the middleware 132, and may include, for example, at least one interface or function (for example, instruction) for file control, window control, image processing, text control, or the like.

According to various embodiments of the present disclosure, the application 134 may include a short message service (SMS)/multimedia messaging service (MMS) application, an email application, a calendar application, an alarm application, a health care application (for example, application measuring a quantity of exercise or blood sugar), an environmental information application (for example, application providing information associated with pressure, humidity, temperature, or the like), or the like. Additionally or alternatively, the application 134 may be an application related to exchanging information between the electronic device 101 and an external electronic device 104. The application related to exchanging information may include, for example, a notification relay application for transferring predetermined information to the external electronic device 104 or a device management application for managing the external electronic device 104.

For example, the notification relay application may include a function of transferring, to the external electronic device 104, notification information generated from other applications of the electronic device 101 (for example, an SMS/MMS application, an e-mail application, a health management application, an environmental information application, and the like). Additionally or alternatively, the notification relay application may receive notification information from, for example, the external electronic device 104, and provide the same to a user. The device management application may manage (for example, install, remove, or update) functions of at least a part of the external electronic device 104 communicating with the electronic device 101 (for example, turning on/off the external electronic device 104 (or some component elements thereof) or adjusting a brightness (or resolution) of a display), an application operating in the external electronic device 104, or a service (for example, a call service or a message service) provided from the external electronic device 104.

According to various embodiments of the present disclosure, the application 134 may include an application designated according to properties (for example, type of electronic device) of the external electronic device 104. For example, when the external electronic device 104 is an MP3 player, the application 134 may include an application related to the reproduction of music. Similarly, when the external electronic device 104 is a mobile medical device, the application 134 may include an application related to health care. According to an embodiment of the present disclosure, the application 134 may include at least one of an application designated to the electronic device 101 and an application received from a server 106 or the external electronic device 104.

The input/output interface 140 may transmit an instruction or data input from a user through an input/output device (for example, a sensor, a display, a keyboard, or touch screen) to the processor 120, the memory 130, the communication interface 160, or the block setting controller 170 through, for example, the bus 110. For example, the input/output interface 140 may provide, to the processor 120, data associated with a user's touch input through a touch screen. The input/output interface 140 may output, through the input/output device (for example, a speaker or a display), instructions or data received, through, for example, the bus 110, from the processor 120, the memory 130, the communication interface 160, or the block setting controller 170. For example, the input/output interface 140 may output voice data processed by the processor 120 to the user through a speaker.

The display 150 may display various pieces of information (for example, multimedia data, text data, or the like) to the user.

The communication interface 160 may connect communication between the electronic device 101 and the electronic device 104 or the server 160. For example, the communication interface 160 may be connected to a network 162 through wireless or wired communication, and communicate with the external electronic device 104. The wireless communication may include at least one of, for example, wireless-fidelity (Wi-Fi), Bluetooth™ (BT), near field communication (NFC), global positioning system (GPS), and cellular communication (for example, long term evolution (LTE), LTE-advanced (LTE-A), code division multiple access (CDMA), wideband CDMA (WCDMA), universal mobile telecommunication system (UMTS), wireless broadband (WiBro), global system for mobile communication (GSM), and the like). The wired communication may include at least one of, for example, a universal serial bus (USB), a high definition multimedia interface (HDMI), Recommended Standard 232 (RS-232), and a plain old telephone service (POTS).

According to an embodiment of the present disclosure, the network 162 may be a communication network. The communication network may include at least one of a computer network, the Internet, the Internet of things (IoT), and a telephone network. According to an embodiment of the present disclosure, a protocol (for example, a transport layer protocol, a data link layer protocol, or a physical layer protocol) for the communication between the electronic device 101 and an external device may be supported by at least one of the application 134, the application programming interface 133, the middleware 132, the kernel 131, and the communication interface 160.

The server 106 may support driving of the electronic device 101 by performing at least one operation (or function) implemented in the electronic device 101. For example, the server 106 may include a block setting control server module 108 that may support the block setting controller 170 embodied in the electronic device 101. For example, the block setting control server module 108 may include at least one component element of the block setting controller 170, and may execute at least one of the operations that the block setting controller 170 executes (for example, may execute at least one of the operations for the block setting controller 170).

The block setting controller 170 may process at least a part of the information obtained from other component elements (for example, the processor 120, the memory 130, the input/output interface 140, the communication interface 160, or the like) and provide the processed information to the user in various ways. For example, the block setting controller 170 may control at least some functions of the electronic device 101 by using the processor 120 or independently from the processor 120, so that the electronic device 101 may interwork with other electronic devices (for example, the electronic device 104 or the server 106). According to an embodiment of the present disclosure, at least one component element of the block setting controller 170 may be included in the server 106 (for example, the block setting control server module 108), and at least one operation implemented in the block setting controller 170 may be supported by the server 106. Hereinafter, additional information associated with the block setting controller 170 will be provided with reference to FIGS. 2 through 8.

Figure 2:
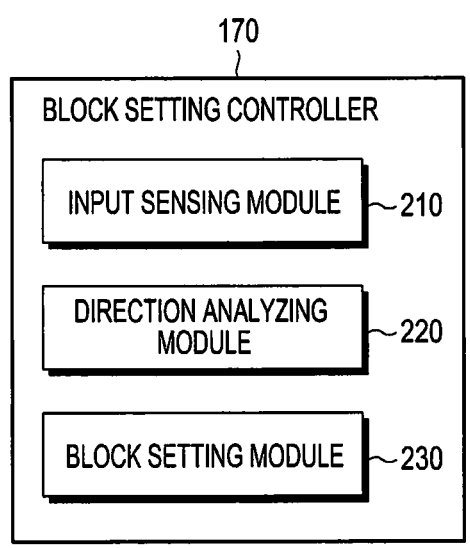
FIG. 2 is a block diagram illustrating a block setting controller of an electronic device, according to an embodiment of the present disclosure.

FIG. 2 is a block diagram illustrating a block setting controller of an electronic device, according to an embodiment of the present disclosure.

Referring to FIG. 2, the block setting controller 170 includes an input sensing module 210, a direction analyzing module 220, and a block setting module 230. The block setting controller 170 may execute at least one function executed by at least one module from among the input sensing module 210, the direction analyzing module 220, and the block setting module 230.

According to an embodiment of the present disclosure, the block setting controller 170 may sense a second touch input that is input while a first touch input is maintained on a key of a keypad through which content is input, in a state in which input content is displayed on the display 150. The block setting controller 170 sets at least a part of the displayed content as a block, based on a movement direction of the sensed second touch input. Although various embodiments of the present disclosure provide descriptions in association with a touch input, it is apparent that the present disclosure is also applied to an input provided by hovering. The key is for setting at least a part of the displayed content as a block, and may include, for example, a 'shift key' included in the keypad.

When a touch is sensed on the display 150 that displays content, the block setting controller 170 may control the display 150 so as to display a cursor at a point where the touch is sensed. In addition, the block setting controller 170 may control a location of a cursor on the display 150 through a cursor controlling function, and may control movement of the cursor to a starting point or an ending point for block setting, through dragging. The cursor controlling function may include a function of changing a location of a cursor using direction keys, and a function of changing a location of a cursor through a 'touch and drag' operation. The content, set as a block, corresponds to a portion from a point where the cursor is located to a point where a movement of the second touch input stops or is terminated.

The block setting controller 170 may shade corresponding content in real time, based on a movement direction of the second touch input. The block setting controller 170 may display a pop-up window for controlling the shaded content, on the display 150. The pop-up window may be displayed when the first touch input is released. The pop-up window may include at least one of a menu item for selecting all displayed content, a menu item for cutting out the shaded content, a menu item for copying the shaded content, and a menu item for pasting previously stored content in a location of the shaded content.

When the second touch input corresponds to a plurality of touch inputs, the block setting controller 170 may set content that is selected based on movement directions of the plurality of inputs, as a block. In addition, when the second touch input corresponds to an input that repeats a 'touch and drag' operation and release of the touch, a plurality of times, the block setting controller 170 may set selected content as a block. The second touch input may include a single 'touch and drag' operation and releasing the touch.

According to an embodiment of the present disclosure, in the state in which content is displayed on the display 150, when a menu button for controlling the displayed content is selected, the block setting controller 170 may display at least one function on the display 150. A keypad may be displayed on the display 150 in response to a selection of the keypad from among the at least one displayed function. The block setting controller 170 may convert the display 150 into a mode for sensing an input for displaying the cursor, so as to set at least a part of the content displayed on the display as a block.

According to an embodiment of the present disclosure, in the state in which input content is displayed on the display 150, the input sensing module 210 may sense the second touch input that is input while a first touch input is maintained on a key of a keypad through which the content is input. When the first touch input is maintained on the display 150 for a predetermined period of time, the input sensing module 210 may determine that the second touch input is for setting at least a part of content as a block. The input sensing module 210 may sense an input of a menu button contained in the electronic device 101, in the state in which content is displayed on the display 150. The menu button may be a hard button on an exterior of the electronic device 101 or a soft button on the bottom or another side of the electronic device 101. When an input through the menu button is sensed, the input sensing module 210 or the block setting controller 170 may display, on the display 150, at least one function for controlling at least a part of the content displayed on the display 150.

According to an embodiment of the present disclosure, the direction analyzing module 220 may analyze a movement direction of an input that is input on the display 150. The direction analyzing module 220 may analyze a movement direction of an input that is input on a keypad displayed on the display 150. The direction analyzing module 220 may analyze a movement direction of the second touch input that is input while the first touch input is maintained on the keypad. The direction analyzing module 220 may calculate a distance of a movement of a dragged second touch input. When a plurality of second touch inputs are input while a first touch input is maintained on the display 150, the direction analyzing module 220 may analyze a movement direction and a movement distance of each second touch input.

According to an embodiment of the present disclosure, the block setting module 230 may set at least a part of the content displayed on the display 150 as a block, based on the movement direction of the second touch input. When a touch is sensed on the displayed content, the block setting module 230 may display a cursor at a point where the touch is sensed. The block setting controller 230 may shade corresponding content in real time, based on a movement direction of the second touch input. The block setting controller 230 may display a pop-up window for controlling the shaded content, on the display 150. The pop-up window may include at least one of a menu item for selecting the entire displayed content, a menu item for cutting out the shaded content, a menu for copying the shaded content, and a menu item for pasting previously stored content in a location of the shaded content.

At least one function executed by the input sensing module 210, the direction analyzing module 220, and the block setting module 230 may be executed in the block setting controller 170 or in the processor 120. Also, a menu display function provided by a pop-up window may be executed in the processor 120 or the application 134. According to various embodiments of the present disclosure, content may include text of a text message, text of Internet news, an image file, and a video file. Also, according to various embodiments of the present disclosure, content may include an object that may be displayed on a display to which various functions, such as editing, deletion, copying, pasting, or the like, are applied.

Figure 3:
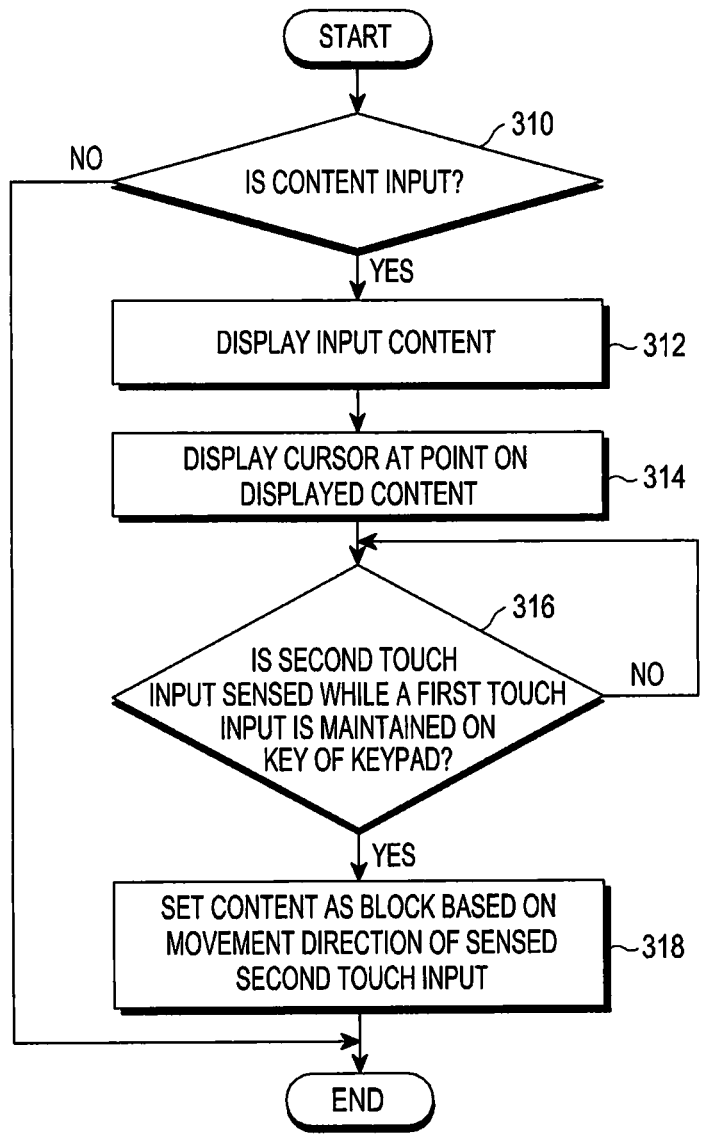
FIG. 3 is a flowchart illustrating a block setting method of an electronic device, according to an embodiment of the present disclosure.

FIG. 3 is a flowchart illustrating a block setting method of an electronic device, according to an embodiment of the present disclosure.

In step 310 it is determined whether content is input. When content is not input, the process terminates. When content is input, the electronic device 101 displays the input content, in step 312. When content is input through a keypad displayed on the display 150, the electronic device 101 may display the input content in real time on the display 150. The content may include a text message that is being input. For example, when a text message is input, the electronic device 101 may display the input text message in real time on the display 150.

A cursor is displayed at a point on the displayed content, in step 314. When a touch or a hovering input is sensed at a point on the displayed content while the input content is displayed, the electronic device 101 may display a cursor at the point where the touch or hovering input is sensed. Also, the electronic device 101 may display a cursor or adjust a location of a displayed cursor though a cursor controlling function. When a 'touch and drag' operation is sensed on a keypad, the electronic device 101 may move a location of the cursor according to the sensed 'touch and drag' operation.

In step 316, it is determined whether a second touch input is sensed while a first touch input is maintained on a key of the keypad. The electronic device 101 senses the first touch input on an area for setting a block in a display of the electronic device 101, and senses the second touch input while the first touch input is maintained on the area. The area includes a portion for displaying a keypad, the first touch input is input by using at least one of keys of the keypad to set the at least a part of the content as the block, and the key comprises a shift key of the keypad. When a second touch input is not sensed while a first touch input is maintained on the keypad, the method repeats step 316 until the second touch input is sensed. When a second touch input is sensed while a first touch input is maintained on a key of the keypad, the electronic device 101 sets content as a block, based on a movement direction of the sensed second touch input, in step 318. When a second touch input repeats a 'touch and drag' operation and release of the touch, a plurality of times, while a first touch input is input and maintained on the display 150, the electronic device 101 may set content as a block based on each second touch input. The electronic device 101 may set, as a block, content configured based on a second touch input, which is input by a single 'touch and drag' operation and release of the touch.

The electronic device 101 may move the displayed cursor based on a movement direction of the second touch input, and display the same. The electronic device 101 may move the displayed cursor based on the movement direction of the second touch input in real time, and may display the moved cursor in real time based on the second touch input. The first touch input is a key for setting at least a part of the content displayed on the display 150, as a block, and may include a 'shift key' included in the keypad.

The electronic device 101 may shade corresponding content on the display 150 in real time, based on the movement direction of the second touch input on the keypad. The electronic device 101 may shade content corresponding to a portion from a point where the cursor is located and a point where a movement of the second touch input stops or is terminated, in real time, based on the movement direction of the second touch input, and set the corresponding content as a block. When a plurality of second touch inputs are sensed, the electronic device 101 may shade content corresponding to a movement direction of each second touch input, and set corresponding content as a block.

The electronic device 101 may display a pop-up window for controlling the shaded content, on the display 150. The pop-up window may include at least one of a menu item for selecting the entire displayed content, a menu item for cutting out the shaded content, a menu item for copying the shaded content, and a menu item for pasting previously stored content in a location of the shaded content. Various embodiments of the present disclosure may include a menu including various functions that may adjust at least a part of the text set as a block to be appropriate for a user, in addition to the above-described menus.

According to various embodiments of the present disclosure, an input may include at least one of a touch, a tap, a double tap, a flick, a drag, a drag-and-drop, a swipe, a multi-swipe, pinches, a touch-and-hold, a shake, and a rotation, based on an input method. A touch is a gesture in which an input unit contacts the display 150. A tap is a gesture in which an input unit shortly and slightly taps the display 150. A double tap is a gesture that quickly taps on the display 150 twice. A flick is a gesture in which in the input unit contacts the display 150, moves quickly, and is then removed (for example, a scroll). A drag is a gesture that moves or scrolls an object displayed on the display 150. A drag and drop is a gesture that moves an object while touching the display 150 with an input unit and removes the input unit while stopping the movement. A swipe is a gesture in which the input unit moves a predetermined distance while touching the display 150. A multi-swipe is a gesture in which at least two input units (or fingers) move a predetermined distance while touching the display 150. Pinches correspond to a gesture in which at least two input units (or fingers) move in different directions from each other while touching the display 150. A touch and hold is a gesture in which a touch or a hovering is input to the display 150 until an object is displayed. A shake is a gesture that shakes an electronic device to execute an operation. A rotation is a gesture that switches a direction of the display 150 from the vertical direction to the horizontal direction, and vice versa. Further, a gesture of the present disclosure may include the swipe that is input by hovering over the display 150 and the flick that is input by hovering over the display 150. The present disclosure may be performed using at least one gesture.

Figure 4A:
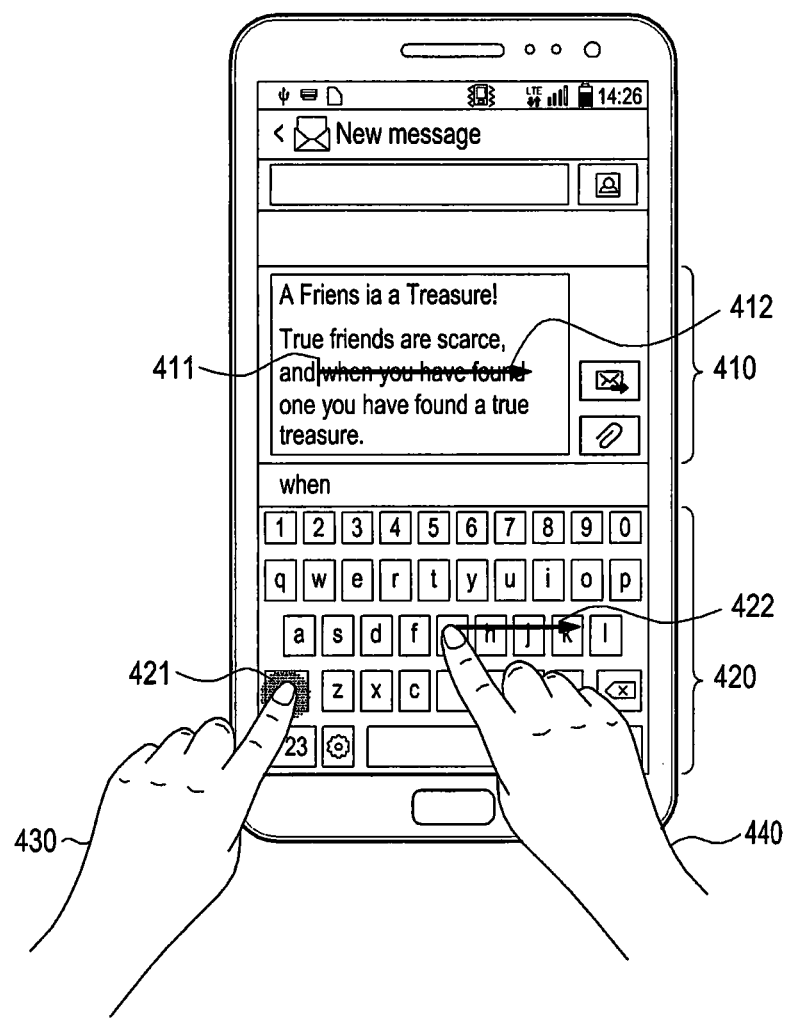
FIG. 4A is a diagram illustrating inputting an input for setting a part of content as a block, according to an embodiment of the present disclosure.
Figure 4B:
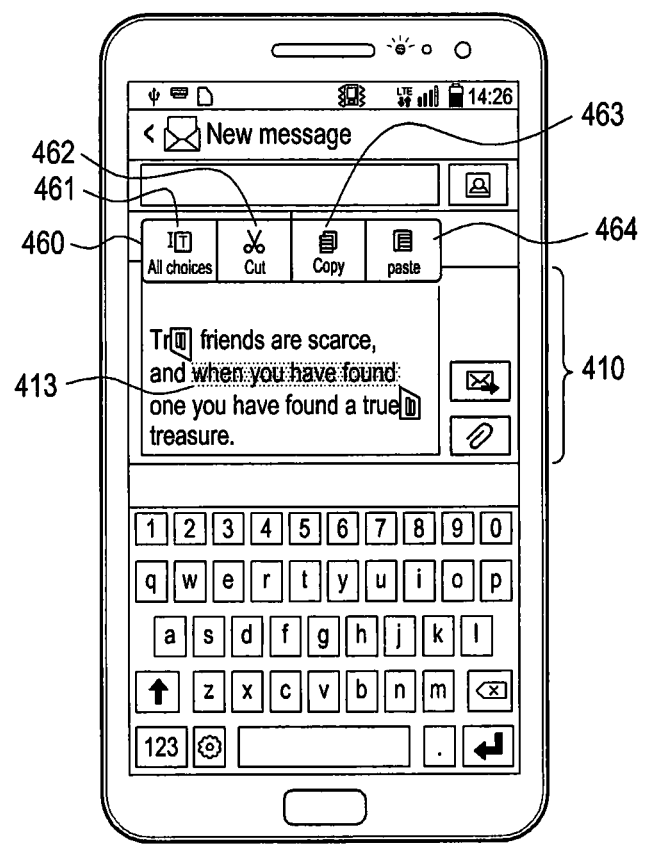
FIG. 4B is a diagram illustrating a part of content set as a block, according to an embodiment of the present disclosure.
Figure 4C:
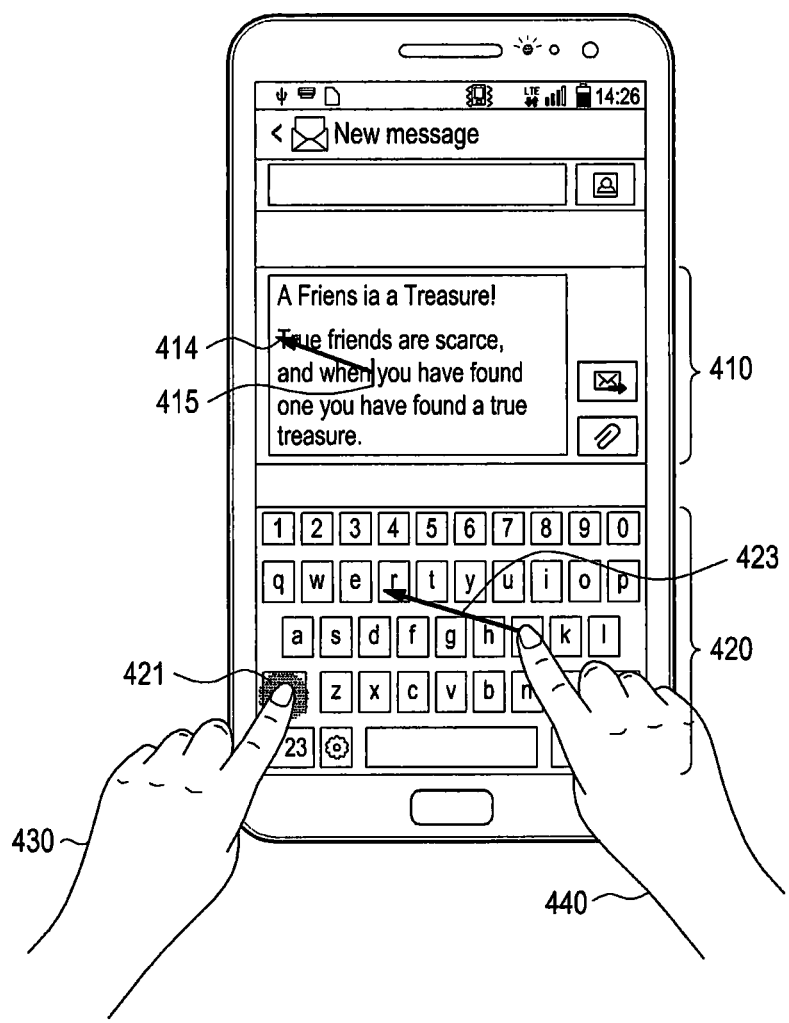
FIG. 4C is a diagram illustrating inputting an input for setting a part of content as a block, according to another embodiment of the present disclosure.
Figure 4D:
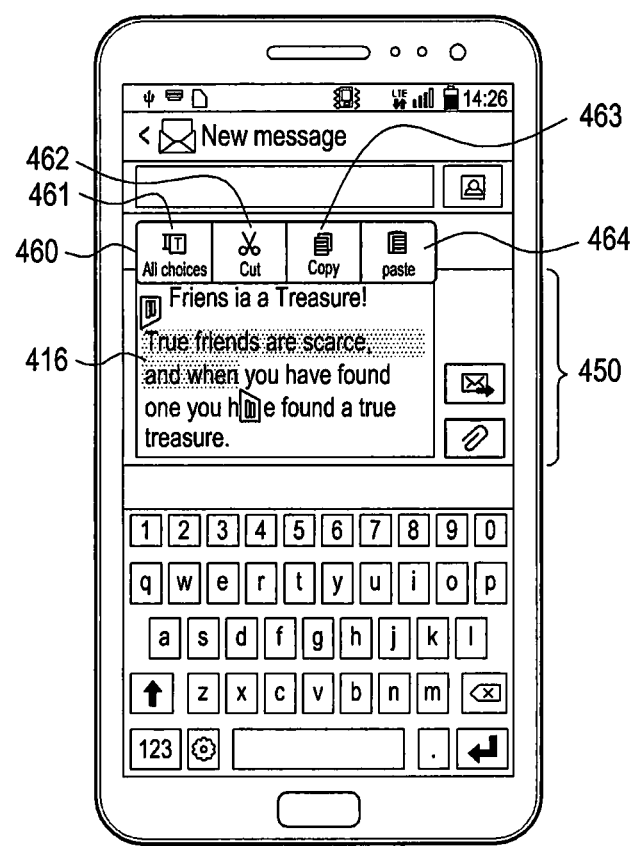
FIG. 4D is a diagram illustrating a part of content set as a block, according to another embodiment of the present disclosure.

FIG. 4A is diagram illustrating inputting an input for setting a part of content as a block, according to an embodiment of the present disclosure. FIG. 4B is a diagram illustrating a part of content set as a block, according to an embodiment of the present disclosure. FIG. 4C is a diagram illustrating an input for setting a part of content as a block, according to another embodiment of the present disclosure. FIG. 4D is a diagram illustrating a part of content is set as a block, according to another embodiment of the present disclosure.

Referring to FIG. 4A, when a text message is input, the display 150 of the electronic device 101 includes an area 410 for displaying an input text message and an area 420 for displaying a keypad through which a text message is input. Also, when a text message is input, the display 150 of the electronic device 101 may include an area 410 for displaying an input text message and an area for setting a block in the display of the electronic device. The area may include a portion for displaying a keypad. When an input, for setting at least a part of displayed content as a block, is sensed at a point 411, the electronic device 101 displays a cursor at the point 411. A first touch input of a first input unit 430 (i.e., left hand of the user) is sensed on a key 421 of the keypad while the cursor is displayed. The electronic device 101 senses a second touch input 422 of a second input unit 440 (i.e., right hand of the user) while the first touch input is maintained at the key 421. The electronic device 101 analyzes a movement direction of the second touch input 422. For example, the first touch input may be an input touches and maintains contact with the keypad, and the second touch input is a horizontal drag to the right. The electronic device 101 may shade content corresponding to a portion of the content from a point where the cursor 411 is located to a point corresponding to a stopping point of the second touch input, display the shaded content, and set the same as a block. A length 412 of the shaded content corresponds to a length of the second touch input 422.

Referring to FIG. 4B, at least a part of the content is set as a block 413 by the first touch input and the second touch input. The electronic device 101 displays a pop-up window 460 for controlling the content that is set as a block. The pop-up window 460 includes at least one of a first menu item 461 for selecting the entire displayed content, a second menu item 462 for cutting out the shaded content, a third menu item 463 for copying the shaded content, and a fourth menu item 464 for pasting previously stored content in a location of the shaded content. According to various embodiments of the present disclosure, a pop-up window may include a menu item corresponding to various functions that may control at least one of the displayed content and the content set as a block, in addition to the above described menus 461, 462, 463, and 464.

Referring to FIG. 4C, an input to set at least a part of the content displayed on the display 150 as a block is sensed at a point 415, and a cursor is displayed at the point 415. The electronic device 101 may sense an input on the key 421. The electronic device 101 also senses a second touch input 423 while the first touch input is maintained on the key 421. The electronic device 101 analyzes a movement direction of the second touch input 423. For example, the second touch input touches the keypad and performs dragging to the upper-left side. The electronic device 101 shades content corresponding to a portion from a point where the cursor 415 is located and to a point corresponding to a stopping point of the second touch input 420, and extends a length 414 corresponding to a length of the second touch input 420. The shaded content is set as a block.

Referring to FIG. 4D, when at least a part of the content is selected by the first touch input and the second touch input in FIG. 4C, the electronic device 101 executes shading with respect to the selected part of the content. The electronic device 101 displays, on the display 450, input content including shaded content 416 that is set as a block. The electronic device 101 displays the pop-up window 460 for controlling the content set as a block.

Figure 5:
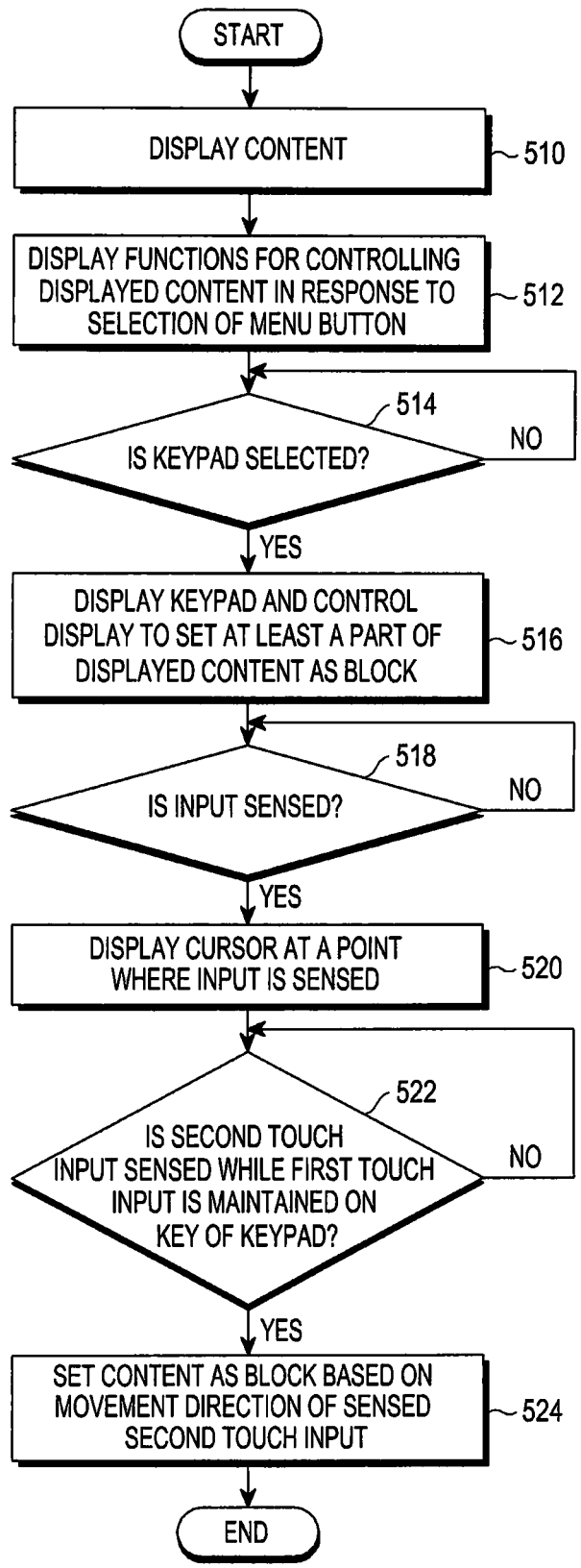
FIG. 5 is a flowchart illustrating a block setting method of an electronic device, according to another embodiment of the present disclosure.

FIG. 5 is a flowchart illustrating a block setting method of an electronic device, according to another embodiment of the present disclosure.

The electronic device 101 displays content, in step 510. The electronic device 101 displays, on the display 150, content such as, content previously stored in the electronic device 101 through a selection of a user or Internet news that is received through access to the Internet. For example, when a user accesses an Internet site, the electronic device 101 may display content provided from the site on the display 150. The site may include at least one of text, an image, a video, and an emoticon. The electronic device 101 senses a selection of a menu button, and displays, in the display 150, at least one function for controlling the displayed content, in step 512. The menu button may be a hard button on the exterior of the electronic device 101 or a soft button on the bottom or another side of the electronic device 101. The at least one function may include various functions, such as, for example, a function of storing displayed content, a function of refreshing the display of content, a function of displaying a keypad, a function of setting a block some content among the displayed content and the like. Different functions may be applied based on the displayed content.

In step 514, it is determined whether the function of displaying the keypad is selected. When the function for displaying the keypad is not selected, step 514 is repeated unit its selection. When the function for displaying the keypad is selected, the electronic device 101 displays the keypad on the display 150, and controls the display 150 to set at least a part of displayed content as a block, in step 516. Also, if the function for setting at least a part among the displayed content into a block is selected, the electronic device 101 may display an area for setting the block in the display, and control the display 150 to set at least the part of displayed content as the block. The area includes a portion for displaying the keypad. Also, if a predetermined touch input on the display is sensed, the electronic device 101 may switch to set at least part of the displayed content with the block. When the function for displaying the keypad is selected while content such as Internet news or the like is displayed, the electronic device 101 may divide the display 150 into an area for displaying the content and an area for displaying the keypad. The electronic device 101 may convert the display 150 into a mode for sensing an input for displaying the cursor, so as to set at least a part of the content displayed on the display 150 as a block.

In step 518, it is determined whether an input is sensed at a point on the content displayed on the display 150. When an input is not sensed, step 518 is repeated until the input is sensed. When an input is sensed at a point on the content displayed on the display 150, a cursor is displayed at the point where the input is sensed, in step 520. An input, according to various embodiments of the present disclosure, may include at least one of a touch input and a hovering input.

In step 522, it is determined whether a second touch input is sensed while a first touch input is maintained on a key of the keypad. When the second touch input is not sensed, step 522 is repeated until it is sensed. When a second touch input is sensed while a first touch input is maintained on a key of the keypad, the electronic device 101 sets content as a block, based on a movement direction of the second touch input, in step 524, as described in detail above.

Figure 6A:
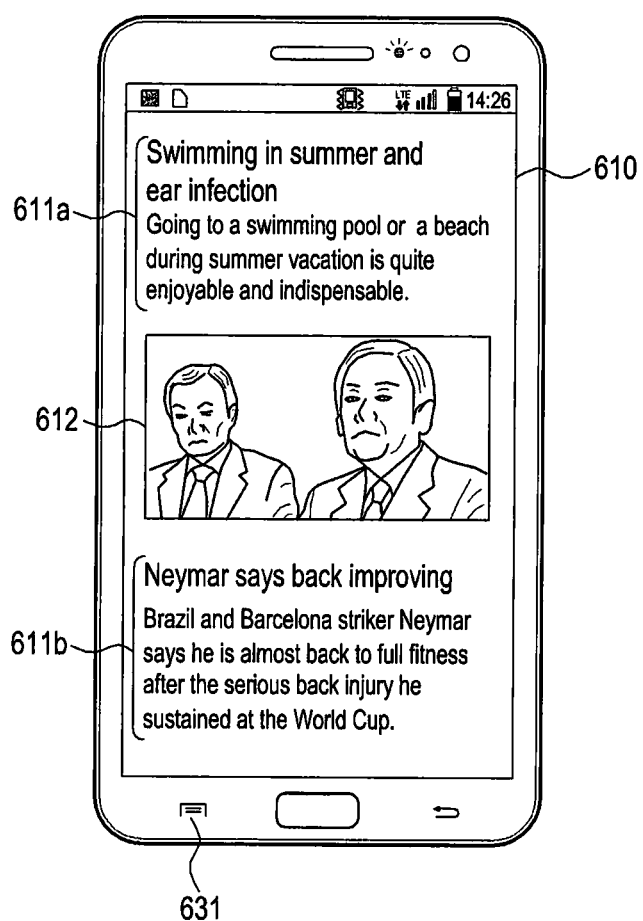
FIG. 6A is a diagram illustrating displayed content, according to an embodiment of the present disclosure.
Figure 6B:
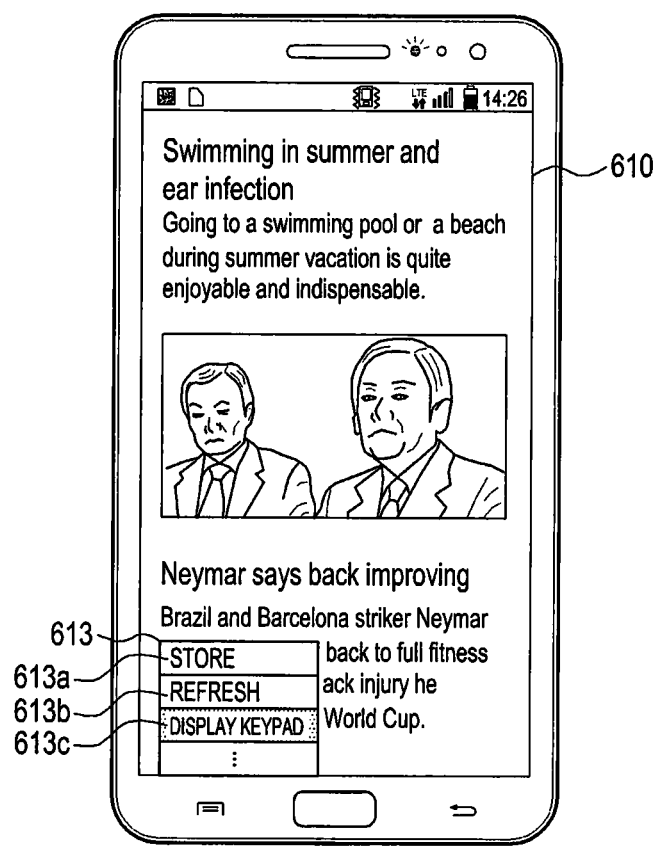
FIG. 6B is a diagram illustrating selection of a menu button, according to an embodiment of the present disclosure.
Figure 6C:
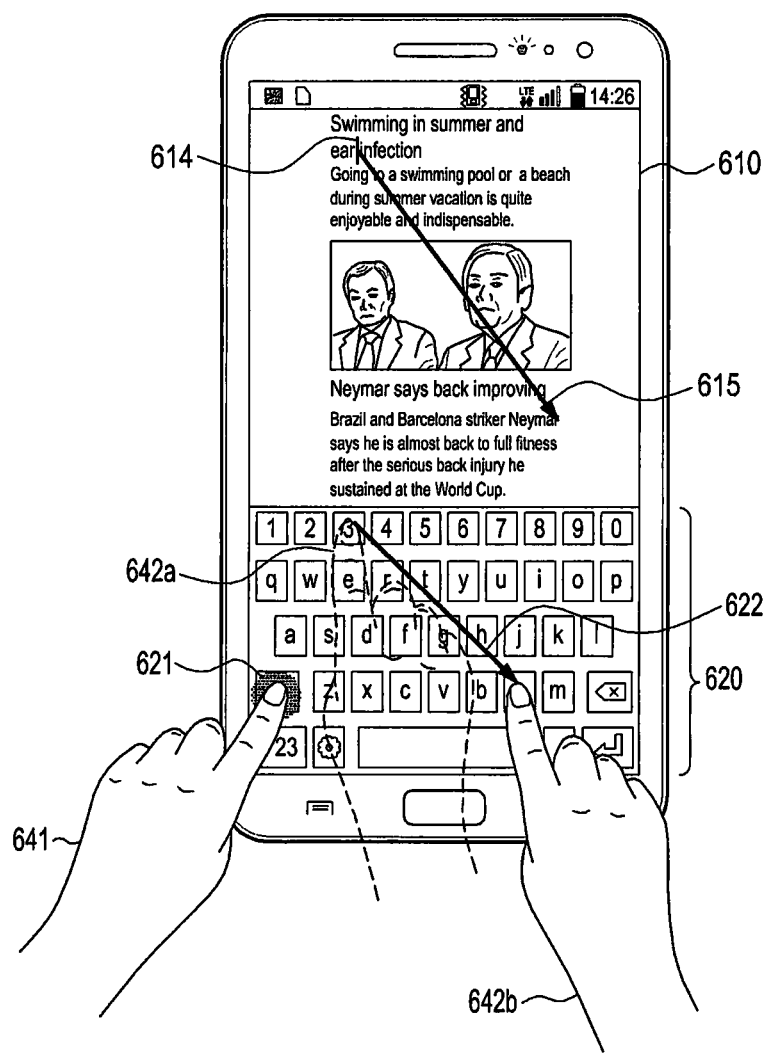
FIG. 6C is a diagram illustrating inputting an input for setting a part of content as a block, according to an embodiment of the present disclosure.
Figure 6D:
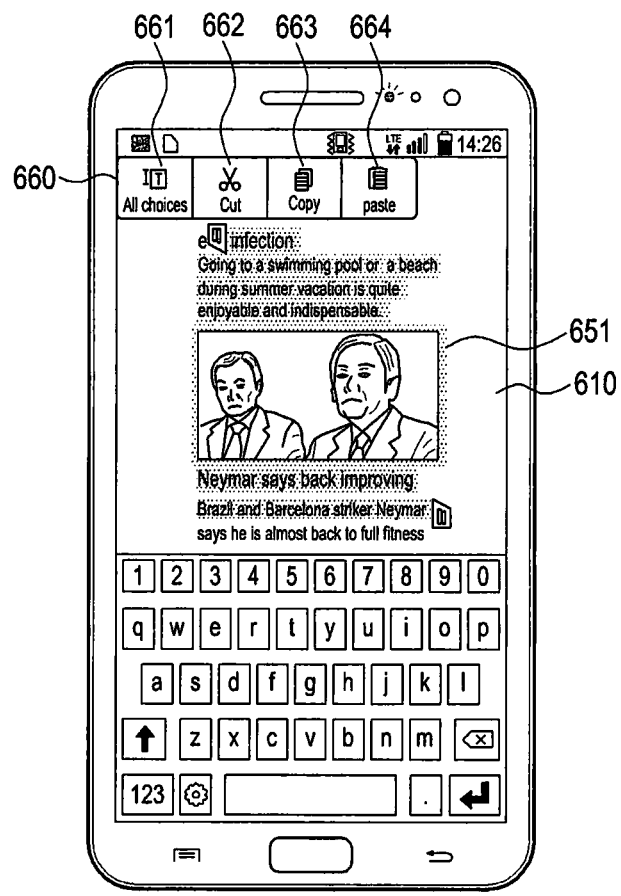
FIG. 6D is a diagram illustrating a part of content set as a block, according to another embodiment of the present disclosure.

FIG. 6A is a diagram illustrating content displayed, according to an embodiment of the present disclosure. FIG. 6B is a diagram illustrating a menu button selected, according to an embodiment of the present disclosure. FIG. 6C is a diagram illustrating inputting an input for setting a part of content as a block, according to an embodiment of the present disclosure. FIG. 6D is a diagram illustrating a part of content set as a block, according to another embodiment of the present disclosure.

Referring to FIG. 6A, the electronic device 101 displays content 610 on the display 150. For example, the content 610 may be a newspaper article on the Internet. The content 610 includes text 611a and 611b and an image file 612 such as a picture. The content may also include various files, such as video, in addition to text and images. The electronic device 101 includes a menu button 631 through which an input for displaying at least one function to control displayed content is received. The menu button 631 may be a hard button on the exterior of the electronic device 101 or a soft button on the bottom or another side of the electronic device 101.

Referring to FIG. 6B, when the menu button 631 is touched in FIG. 6A, the electronic device 101 displays a pop-up window 613 showing various functions that may be applied to displayed content. The pop-up window 613 may be displayed in response to a selection of the menu button 631 or a selection of another button. The pop-up window 613 may include different functions based on a type, a size, and a kind of displayed content. For example, when the displayed content is Internet news, the pop-up window 613 includes a first function 613a for storing displayed content, a second function 613b for refreshing displayed content, and a third function 613c for displaying a keypad for setting at least a part of displayed content as a block. The pop-up window 61 may also include various other functions for controlling displayed content, in addition to the above described functions 613a, 613b, and 613c. When the third function for displaying a keypad is selected, the electronic device 101 may convert the display 150 into a mode for sensing an input for displaying a cursor, so as to set at least a part of the content displayed on the display 150 as a block.

Referring to FIG. 6C, when an input to set at least a part of displayed content as a block is sensed at a point 614 on the display 610, the electronic device 101 displays a cursor at the point 614

A first touch input of a first input unit (i.e. a left hand of the user) 641 is input on a key 621 of a keypad 620 while the cursor is displayed. The electronic device 101 senses a second touch input 622 of a second input unit (i.e., the right hand) 642a and 642b while the first touch input is maintained on the key 621. The electronic device 101 analyzes a movement direction of the second touch input 622, as described above. When the first touch input and the second touch input are sensed, the electronic device 101 may shade content corresponding to a portion from a point where the cursor 614 is located and to a point 615 corresponding to a length and a stopping point of the second touch input 622, display the shaded content, and set the same as a block.

Referring to FIG. 6D, when at least a part of the content is selected to be set as a block by the first touch input and the second touch input in FIG. 6C, the electronic device 101 displays input content including the content set as a block 651, on the display 150. The electronic device 101 displays a pop-up window 660 for controlling the content set as a block. The pop-up window 660 includes at least one of a first menu item 661 for selecting the entire displayed content, a second menu item 662 for cutting out the shaded content, a third menu item 663 for copying the shaded content, and a fourth menu item 664 for pasting previously stored content in a location of the shaded content. According to various embodiments of the present disclosure, the pop-up window may include a menu item corresponding to various functions that may control at least one of the displayed content and the content set as a block to be appropriate for an intention of a user, in addition to the above described menus 661, 662, 663, and 664.

Figure 7:
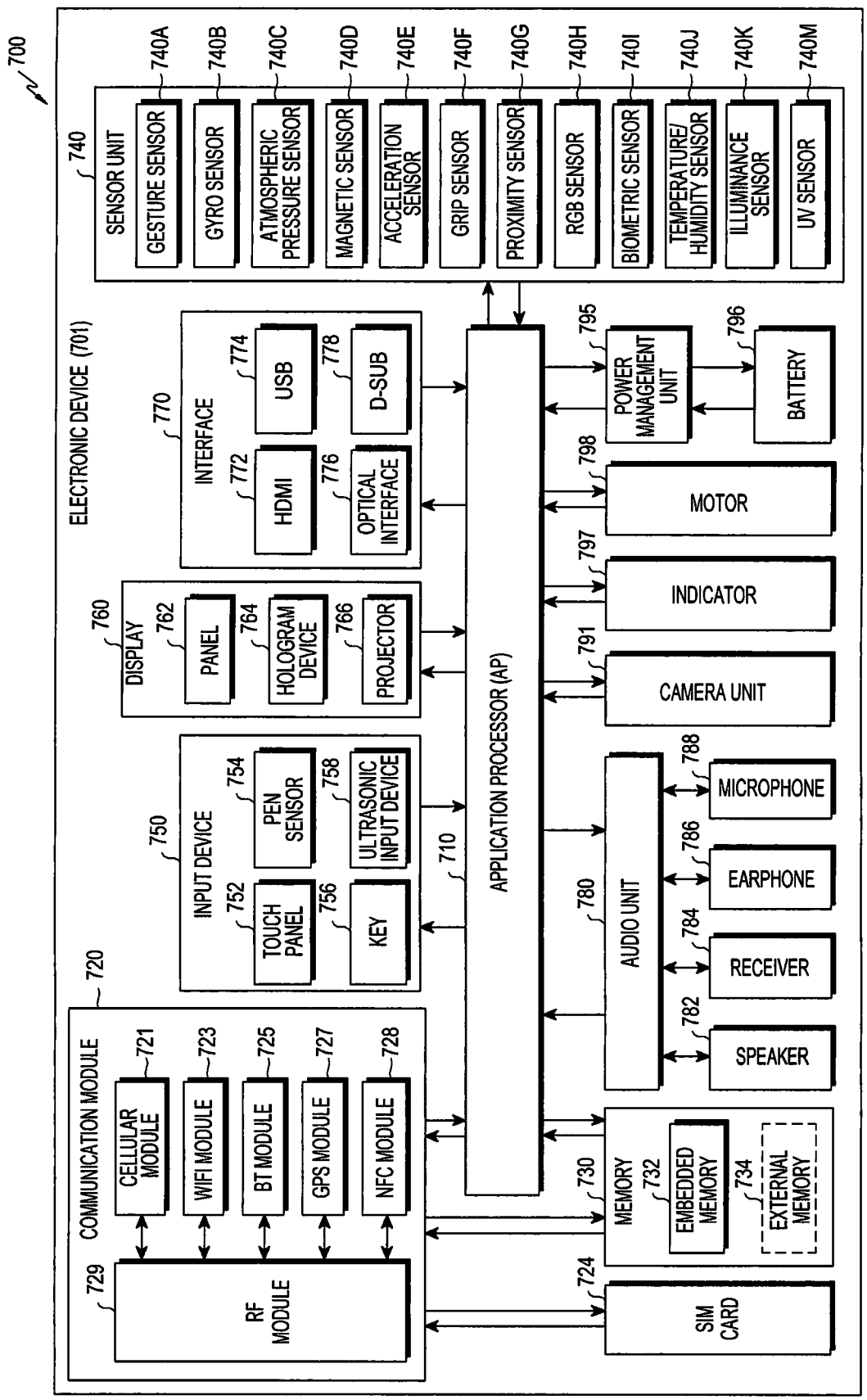
FIG. 7 is a block diagram illustrating an electronic device, according to an embodiment of the present disclosure.

FIG. 7 is a block diagram illustrating an electronic device, according to an embodiment of the present disclosure.

For example, the electronic device may configure a part or the entirety of the electronic device 101 illustrated in FIG. 1. Referring to FIG. 7, an electronic device 701 includes at least one application processor (AP) 710, a communication module 720, a subscriber identification module (SIM) card 724, a memory 730, a sensor unit 740, an input device 750, a display 760, an interface 770, an audio unit 780, a camera unit 791, a power management unit 795, a battery 796, an indicator 797, and a motor 798.

The AP 710 may control a plurality of hardware or software component elements connected to the AP 710 by driving an operating system or an application program, execute data processing and calculations with respect to various types of data including multimedia data. The AP 710 may be embodied as, for example, a system on chip (SoC). According to an embodiment of the present disclosure, the AP 710 may further include a graphic processing unit (GPU).

The communication unit 720 (for example, the communication interface 160) may perform data transmission/reception in communication between the electronic device 701 (for example, the electronic device 101) and other electronic devices (for example, the external electronic device 104 and the server 106) connected over a network. According to an embodiment of the present disclosure, the communication unit 720 includes a cellular module 721, a WiFi module 723, a BT module 725, a GPS module 727, an NFC module 728, and a radio frequency (RF) module 729.

The cellular module 721 may provide a voice call, a video call, a text message service, an Internet service, or the like through a communication network (for example, LTE, LTE-A, CDMA, WCDMA, UMTS, WiBro, GSM, or the like). Also, the cellular module 721 may identify and authenticate an electronic device in a communication network using, for example, a SIM (for example, the SIM card 724). According to an embodiment of the present disclosure, the cellular module 721 may perform at least some of functions that the AP 710 may provide. For example, the cellular module 721 may perform at least a part of the multimedia control function.

According to an embodiment of the present disclosure, the cellular module 721 may include a communication processor (CP). Furthermore, the cellular module 721 may be embodied as, for example, a System on Chip (SoC). Although FIG. 7 illustrates the component elements, such as the cellular module 721 (for example, the CP), the memory 730, the power management unit 795, or the like as separate component elements from the AP 710, the AP 710 may be embodied to include at least a part of the above described component elements (for example, the cellular module 721), according to an embodiment of the present disclosure.

According to an embodiment of the present disclosure, the AP 710 or the cellular module 721 (for example, the CP) may load, into a volatile memory, instructions or data received from at least one of a non-volatile memory and other component elements connected thereto, and may process the loaded instructions or data. Furthermore, the AP 710 or the cellular module 721 may store, in a non-volatile memory, data received from or generated by at least one of the other component elements.

Each of the Wi-Fi module 723, the BT module 725, the GPS module 727, and the NFC module 728 may include, for example, a processor for processing data transmitted/received through a corresponding module. Although the cellular module 721, the Wi-Fi module 723, the BT module 725, the GPS module 727, and the NFC module 728 are illustrated as individual blocks, two or more of the cellular module 721, the Wi-Fi module 723, the BT module 725, the GPS module 727, and the NFC module 728 may be included in an integrated chip (IC) or an IC package, according to an embodiment of the present disclosure. For example, at least some processors corresponding to the cellular module 721, the WiFi module 723, the BT module 725, the GPS module 727, and the NFC module 728, respectively (for example, a CP corresponding to the cellular module 721 and a WiFi processor corresponding to the WiFi module 723) may be embodied as a single SoC.

The RF module 729 may transmit/receive data, for example, an RF signal. The RF module 729 may include, for example, a transceiver, a power amp module (PAM), a frequency filter, a low noise amplifier (LNA), or the like. Furthermore, the RF module 729 may further include a component for transmitting/receiving electronic waves over a free air space in wireless communication, for example, a conductor, a conducting wire, or the like. Although the cellular module 721, the Wi-Fi module 723, the BT module 725, the GPS module 727, and the NFC module 728 are illustrated to share one RF module 729 in FIG. 7, at least one of the cellular module 721, the Wi-Fi module 723, the BT module 725, the GPS module 727, and the NFC module 728 may transmit/receive the RF signal through a separate RF module, according to an embodiment of the present disclosure.

The SIM card 724 may include a subscriber identification module and may be inserted into a slot formed in a particular portion of the electronic device. The SIM card 724 may include unique identification information (for example, an integrated circuit card identifier (ICCID)) or subscriber information (for example, an international mobile subscriber identity (IMSI)).

The memory 730 (for example, the memory 130) may include at least one of an embedded memory 732 and an external memory 734. The embedded memory 732 may include at least one of a volatile memory (for example, a dynamic random access memory (DRAM), a static RAM (SRAM), a synchronous DRAM (SDRAM), and the like) and a non-volatile memory (for example, a programmable read only memory (PROM), a one time PROM (OTPROM), an erasable PROM (EPROM), an electrically ERPOM (EEPROM), a mask ROM, a flash ROM, a NAND flash memory, a NOR flash memory, and the like).

According to an embodiment of the present disclosure, the embedded memory 732 may be a solid state drive (SSD). The external memory 734 may further include a flash drive, for example, a compact flash (CF), a secure digital (SD), a micro-SD, a mini-SD, an extreme digital (xD), a memory stick, or the like. The external memory 734 may be functionally connected to the electronic device 701 through various interfaces. According to an embodiment of the present disclosure, the electronic device 701 may further include a storage device (or storage medium) such as a hard drive.

The sensor unit 740 may measure a physical quantity or detect an operating state of the electronic device 701, and convert the measured or detected information into an electric signal. The sensor unit 740 includes, for example, at least one of a gesture sensor 740A, a gyro sensor 740B, an atmospheric pressure sensor 740C, a magnetic sensor 740D, an acceleration sensor 740E, a grip sensor 740F, a proximity sensor 740G, a color sensor 740H (for example, red, green, and blue (RGB) sensor), a biometric sensor 740I, a temperature/humidity sensor 740J, an illumination sensor 740K, and an ultra violet (UV) sensor 740M. Additionally or alternatively, the sensor unit 740 may include, for example, an E-nose sensor, an electromyography (EMG) sensor, an electroencephalogram (EEG) sensor, an electrocardiogram (ECG) sensor, an infrared (IR) sensor, an iris sensor, a fingerprint sensor, and the like. The sensor unit 740 may include at least one sensor that may sense or recognize the biometric information such as, a fingerprint, a foot fingerprint, a iris, a face, a heartbeat rate, a brainwave, a joint, pulse or the like. Also, the sensor unit 740 may include various sensors that may sense or recognize biometric information of a user or information associated with bending a joint of a user, in addition to the above-described sensors. The sensor unit 740 may further include a control circuit for controlling at least one sensor included therein.

The input device 750 includes at least one of a touch panel 752, a (digital) pen sensor 754, a key 756, and an ultrasonic input device 758. The touch panel 752 may recognize a touch input in at least one type among, for example, a capacitive type, a resistive type, an infrared type, and an ultrasonic type. The touch panel 752 may further include a control circuit. In the case of the capacitive type, physical contact or proximity recognition is possible. The touch panel 752 may further include a tactile layer. In this case, the touch panel 752 may provide a tactile reaction to a user.

The (digital) pen sensor 754 may be implemented, for example, using a method identical or similar to receiving a user's touch input or using a separate recognition sheet. The key 756 may include, for example, a physical button, an optical key, or a keypad. The ultrasonic input device 758 is a unit that may identify data by generating an ultrasonic signal through an input tool and detecting a sonic wave through a microphone (for example, a microphone 788) in the electronic device 701, and is capable of wireless recognition. According to an embodiment of the present disclosure, the electronic device 701 may also receive a user input from an external device (for example, a computer or a server) connected thereto, using the communication unit 720.

The display 760 (for example, the display 150) includes at least one of a panel 762, a hologram device 764, and a projector 766. The panel 762 may be, for example, a liquid crystal display (LCD), active-matrix organic light emitting diode (AM-OLED), or the like. The panel 762 may be embodied to be, for example, flexible, transparent, or wearable. The panel 762 may also be integrated with the touch panel 752 as a single module. The hologram device 764 may show a stereoscopic image in the air using interference of light. The projector 766 may project light onto a screen to display an image. For example, the screen may be located inside or outside the electronic device 701. According to an embodiment of the present disclosure, the display 760 may further include a control circuit for controlling the panel 762, the hologram device 764, or the projector 766.

The interface 770 includes at least one of a high-definition multimedia interface (HDMI) 772, a universal serial bus (USB) 774, an optical interface 776, and a D-subminiature (D-sub) 778. The interface 770 may be included in, for example, the communication interface 160 illustrated in FIG. 1. Additionally or alternatively, the interface 770 may include, for example, a mobile high-definition link (MHL) interface, a secure digital (SD) card/multi-media card (MMC) interface, or an infrared data association (IrDA) standard interface.

The audio unit 780 may bilaterally convert a sound and an electric signal. At least some component elements of the audio unit 780 may be included in, for example, the input/output interface 140 illustrated in FIG. 1. The audio unit 780 may process, for example, sound information input or output through a speaker 782, a receiver 784, an earphone 786, the microphone 788, or the like.

The camera 791 is a device for capturing a still image or a video, and according to an embodiment of the present disclosure, may include one or more image sensors (for example, a front sensor or a rear sensor), a lens, an image signal processor (ISP), or a flash (for example, an LED or xenon lamp).

The power management unit 795 may manage power of the electronic device 701. Although not illustrated, the power management unit 795 may include, for example, a power management integrated circuit (PMIC), a charger integrated circuit (IC), or a battery gauge.

The PMIC may be mounted, for example, in integrated circuits or SoC semiconductors. The charging methods may be classified into wired charging and wireless charging. The charger IC may charge a battery and prevent inflow of excessive voltage or excessive current from a charger. According to an embodiment of the present disclosure, the charger IC may include a charger IC for at least one of the wired charging method and the wireless charging method. Examples of the wireless charging may include magnetic resonance charging, magnetic induction charging, and electromagnetic charging, and an additional circuit such as a coil loop, a resonance circuit, a rectifier or the like may be added for the wireless charging.

The battery gauge may measure, for example, a residual quantity of the battery 796, a voltage, a current, or a temperature during charging. The battery 796 may store or generate electricity and supply power to the electronic device 701 using the stored or generated electricity. The battery 796 may include, for example, a rechargeable battery or a solar battery.

The indicator 797 may show particular statuses of the electronic device 701 or a part (for example, AP 710) of the electronic device 701, for example, a boot-up status, a message status, a charging status, and the like. The motor 798 may convert an electric signal into mechanical vibration. Although not illustrated, the electronic device 701 may include a processing device (for example, a GPU) for supporting mobile TV. The processing device for supporting the mobile TV may process media data according to standards, for example, a digital multimedia broadcasting (DMB), a digital video broadcasting (DVB), a media flow, or the like.

Each of the components of the electronic device, according to embodiments of the present disclosure, may be implemented by one or more components and the name of the corresponding component may vary depending on the type of the electronic device. The electronic device, according to embodiments of the present disclosure, may be configured by including at least one of the above-described elements, and some of the elements may be omitted, or other elements may be added. Further, some of the elements of the electronic device, according to embodiments of the present disclosure, may be combined to be one entity, which can perform the same functions as those of the elements before the combination.

Figure 8:
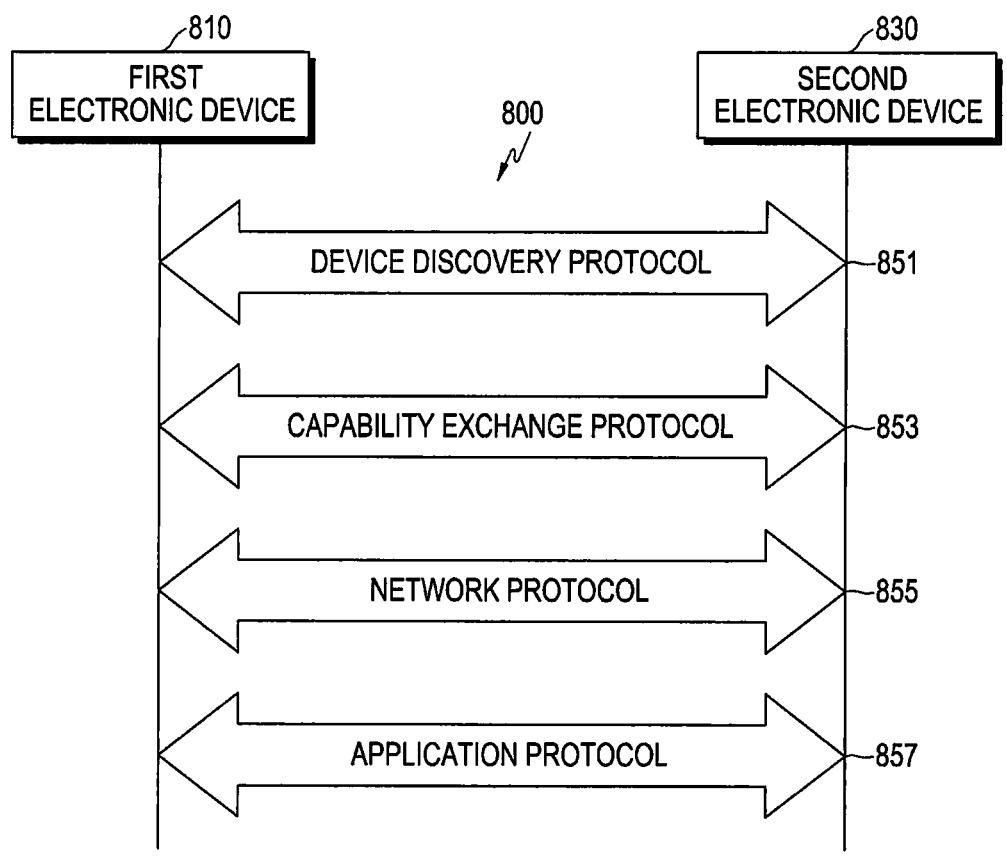
FIG. 8 is a diagram illustrating a communication protocol among a plurality of electronic devices, according to an embodiment of the present disclosure.

FIG. 8 is a diagram illustrating a communication protocol among a plurality of electronic devices, according to an embodiment of the present disclosure.

Referring to FIG. 8, for example, a communication protocol 800 includes a device discovery protocol 851, a capability exchange protocol 853, a network protocol 855, an application protocol 857, and the like.

According to an embodiment of the present disclosure, the device discovery protocol 851 is used by electronic devices (for example, the first electronic device 810 or the second electronic device 830) to detect an external electronic device that is capable of communicating with the electronic devices, or to connect to the detected external electronic device. For example, the first electronic device 810 (for example, the electronic device 101) may sense the second electronic device 830 (for example, the external electronic device 104) through a communication method available in the first electronic device 810 (for example, Wifi, BT, USB, or the like), using the device discovery protocol 851. The first electronic device 810 may obtain identification information associated with the second electronic device 830 detected using the device discovery protocol 851, and store the same, for a communication connection with the second electronic device 830. The first electronic device 810 may establish a communication connection with the second electronic device 830, based on, for example, at least the identification information.

According to an embodiment of the present disclosure, the device discovery protocol 851 provides mutual authentication between a plurality of electronic devices. For example, the first electronic device 810 may execute authentication between the first electronic device 810 and the second electronic device 830, based on communication information (for example, a media access control (MAC) address, a universally unique identifier (UUID), a subsystem identification (SSID), and an IP address for a connection with at least one second electronic device 830.

According to an embodiment of the present disclosure, the capability exchange protocol 853 allows for the exchange of information associated with a function of a service that may be supported by at least one of the first electronic device 810 and the second electronic device 830. For example, the first electronic device 810 and the second electronic device 830 may exchange information associated with a function of a service that each electronic device currently provides, through the capability exchange protocol 853. The information that may be exchanged may include identification information indicating a predetermined service from among a plurality of services that may be provided in the first electronic device 810 and the second electronic device 830. For example, the first electronic device 810 may receive, from the second electronic device 830, identification information of a predetermined service provided by the second electronic device 830, through the capability exchange protocol 853. In this instance, the first electronic device 810 may determine whether the first electronic device 810 supports the predetermined service, based on the received identification information.

According to an embodiment of the present disclosure, the network protocol 855 may control data flow, for example, which is transmitted or received between electronic devices connected for communication (for example, the first electronic device 810 and the second electronic device 830), to provide services by working together. For example, at least one of the first electronic device 810 and the second electronic device 830 may execute error control, data quality control, or the like using the network protocol 855. Additionally or alternatively, the network protocol 855 may determine a transmission format of data transmitted or received between the first electronic device 810 and the second electronic device 830. Also, at least one of the first electronic device 810 and the second electronic device 830 may manage at least a session (connect a session or terminate a session) for exchanging data between them using the network protocol 855.

According to an embodiment of the present disclosure, the application protocol 757 may provide a procedure or information for exchanging data related to a service provided to an external electronic device. For example, the first electronic device 810 (for example, the electronic device 101) may provide a service to the second electronic device 830 (for example, the electronic device 104 or the server 106) through the application protocol 857.

According to an embodiment of the present disclosure, the communication protocol 800 may include a standard communication protocol, a communication protocol designated by an individual or organization (for example, a communication protocol self-designated by a communication device manufacturing company or a network supplying company), or a combination thereof.

The term "module", as used herein, may refer to, for example, a unit including one or more combinations of hardware, software, and firmware. The term "module" may be interchangeable with a term, such as a unit, a logic, a logical block, a component, or a circuit. The module may be a minimum unit of an integrated component element or a part thereof. The module may be a minimum unit for performing one or more functions or a part thereof. The module may be mechanically or electronically implemented. For example, the module, according to embodiments of the present disclosure, may include at least one of an application-specific integrated circuit (ASIC) chip, a field-programmable gate array (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. When the instruction is performed by at least one processor (for example, the processor 210), the at least one processor may perform a function corresponding to the instruction. The computer-readable storage medium may be, for example, the memory 220. At least some of the programming modules may be implemented (for example, executed) by, for example, the processor 210. At least some of the programming modules may include, for example, a module, a program, a routine, a set of instructions or a process for performing one or more functions.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a ROM, a RAM, and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The module or programming module, according to an embodiment of the present disclosure, may include one or more of the above-described elements. Alternatively, some of the above-described elements may be omitted from the programming module. Alternatively, the programming module may further include additional elements. Operations executed by a module, a programming module, or other component elements according to the present disclosure may be executed sequentially, in parallel, repeatedly, or in a heuristic manner. Further, some operations may be executed in a different order, some of the operations may be omitted, or other operations may be added. According to various embodiments of the present disclosure, a storage medium stores instructions, and the instructions are set to enable at least one processor to execute at least one operation when the instructions are executed by the at least one processor, the instructions including: a first instruction set to display input content, a second instruction set to sense a second touch input that is input while a first touch input is maintained on a key of a keypad through which the content is input, and a third instruction set to set at least a part of the displayed content as a block based on a movement direction of the sensed second touch input.

While the disclosure has been shown and described with reference to certain embodiments thereof, it will be understood by those skilled in the art that various changes in form and detail may be made therein without departing from the spirit and scope of the invention as defined by the appended claims.

What is claimed is:

1. A method for selecting at least part of content as a block in an electronic device, the method comprising:
    displaying, by a processor, the content on a display of the electronic device; and detecting, by the processor, a first touch input on a shift key of a keypad for selecting at least part of the displayed content as a block, the keypad being displayed on the display,
when a plurality of touch inputs are detected on the displayed keypad while the first touch input is maintained on the shift key, the at least part of the content is selected as the block based on directions and lengths of the plurality of touch inputs, and
when a single touch input is detected on the displayed keypad while the first touch input is maintained on the shift key, the at least part of the content is selected as the block to correspond to a portion from a point where a cursor is displayed to a point corresponding to a direction and a length of the single touch input.

2. The method of claim 1, further comprising:
detecting a touch on the content; and
displaying the cursor at a point in the content where the touch is detected.

3. The method of claim 1, further comprising:
shading the at least part of the content selected as the block in real time, based on the plurality of touch inputs or the single touch input.

4. The method of claim 3, further comprising:
displaying a pop-up window to control the block of shaded content.

5. The method of claim 4, wherein the pop-up window comprises at least one of a first menu item for selecting all of the content, a second menu item for cutting out the block of shaded content, a third menu item for copying the block of shaded content, and a fourth menu item for pasting previously stored content into a location of the block of shaded content.

6. The method of claim 1, wherein, prior to detecting the first touch input, further comprising:
displaying, on the display, at least one function for controlling the content while the content is displayed on the display;
detecting, by the electronic device, a selection of a keypad function from the at least one function; and
displaying the keypad on the display in response to the selection of the keypad.

7. The method of claim 6, wherein the at least one function is displayed on the display in response to a selection of a menu button of the electronic device.

8. The method of claim 6, further comprising:
converting the display into a mode for detecting an input to display a cursor, so as to select the at least part of the content as the block.

9. An electronic device for selecting at least part of content as a block, the electronic device comprising:
a display configured to display content; and
a processor configured to:
detect a first touch input on a shift key of a keypad for selecting at least part of the displayed content as a block, the keypad being displayed on the display,
when a plurality of touch inputs are detected on the displayed keypad while the first touch input is maintained on the shift key, the at least part of the content is selected as the block based on directions and lengths of the plurality of touch inputs, and
when a single touch input is detected on the displayed keypad while the first touch input is maintained on the shift key, the at least part of the content is selected as the block to correspond to a portion from a point where a cursor is displayed to a point corresponding to a direction and a length of the single touch input.

10. The electronic device of claim 9, wherein the processor is further configured to:
detect a touch on the content; and
display the cursor at a point in the content where the touch is detected.

11. The electronic device of claim 9, wherein the processor is further configured to shade the at least part of the content selected as the block in real time, based on the plurality of touch inputs or the single touch input.

12. The electronic device of claim 11, wherein the processor is further configured to generate a pop-up window for controlling the block of shaded content, and display the pop-up window on the display.

13. The electronic device of claim 12, wherein the pop-up window comprises at least one of a first menu item for selecting all of the content, a second menu item for cutting out the block of shaded content, a third menu item for copying the block of shaded content, and a fourth menu item for pasting previously stored content into a location of the block of shaded content.

14. The electronic device of claim 9, wherein the processor is further configured to:
detect an input on a menu button of the electronic device while the content is displayed on the display; and
display at least one function to control the content.

15. The electronic device of claim 14, wherein the processor is further configured to:
detect a selection of a keypad function from the at least one function; and
display the keypad on the display.

16. The electronic device of claim 15, wherein the processor is further configured to convert the display into a mode for detecting an input to display the cursor, so as to select, as the block, the at least part of the content.

17. A non-transitory computer-readable storage medium that stores a program including instructions to control selecting at least part of content as a block in an electronic device, the instructions comprising:
a first instruction set that displays the content; and
a second instruction set that detects a first touch input on a keypad for selecting at least part of the displayed content as a block, the keypad being displayed on the display,
when a plurality of touch inputs are detected on the displayed keypad while the first touch input is maintained on the shift key, the at least part of the content is selected as the block based on directions and lengths of the plurality of touch inputs, and
when a single touch input is detected on the displayed keypad while the first touch input is maintained on the shift key, the at least part of the content is selected as the block to correspond to a portion from a point where a cursor is displayed to a point corresponding to a direction and a length of the single touch input.

* * * * *